US011995644B2

(12) United States Patent
Keskar

(10) Patent No.: US 11,995,644 B2
(45) Date of Patent: May 28, 2024

(54) SYSTEM AND METHOD FOR MANAGING TRANSACTIONAL INTEROPERABILITY AMONGST BLOCKCHAINS

(71) Applicant: Innoplexus AG, Eschborn (DE)

(72) Inventor: Abhijit Keskar, Pune (IN)

(73) Assignee: INNOPLEXUS AG, Eschborn (DE)

( * ) Notice: Subject to any disclaimer, the term of this patent is extended or adjusted under 35 U.S.C. 154(b) by 270 days.

(21) Appl. No.: 16/992,579

(22) Filed: Aug. 13, 2020

(65) Prior Publication Data
US 2021/0049589 A1 Feb. 18, 2021

Related U.S. Application Data

(60) Provisional application No. 62/886,047, filed on Aug. 13, 2019.

(51) Int. Cl.
G06Q 20/36 (2012.01)
G06F 16/13 (2019.01)
G06F 16/182 (2019.01)
G06F 16/23 (2019.01)
G06Q 10/10 (2023.01)
(Continued)

(52) U.S. Cl.
CPC ....... G06Q 20/3676 (2013.01); G06F 16/137 (2019.01); G06F 16/182 (2019.01); G06F 16/2379 (2019.01); G06Q 10/10 (2013.01); G06Q 20/0655 (2013.01); G06Q 20/3827 (2013.01); G06Q 20/3829 (2013.01);
(Continued)

(58) Field of Classification Search
CPC ................ G06Q 20/00–425; H04L 9/00–50
See application file for complete search history.

(56) References Cited

U.S. PATENT DOCUMENTS 10,901,983 B2 * 1/2021 Zhang ................. G06F 16/2379
11,329,818 B2 * 5/2022 Treat ..................... H04L 9/3239
(Continued)

OTHER PUBLICATIONS

Andreas M. Antonopoulos, Mastering Bitcoin, Dec. 1, 2014, O'Reilly Media, Inc. (Year: 2014).*

(Continued)

Primary Examiner — Ari Shahabi
(74) Attorney, Agent, or Firm — ZIEGLER IP LAW GROUP, LLC.; Frank E. Levine

(57) ABSTRACT

Disclosed is system and method for managing transactional interoperability amongst plurality of blockchains, the plurality of blockchains comprising a non-host blockchain and a host blockchain. The server arrangement is configured to append a first transaction to the non-host blockchain, first transaction comprising metadata pertaining to the user transaction, append a second transaction to the host blockchain, the second transaction comprising the first hash address, wherein second transaction triggers an initial smart contract of the host blockchain to store an operational information response at a second hash address in the distributed file storage system; append a third transaction to non-host blockchain, the third transaction comprising the second hash address, append a fourth transaction in the host blockchain, fourth transaction comprising third hash address, wherein the fourth transaction triggers initial smart contract of the host blockchain to update user wallet account based on output generated from the execution of user transaction.

14 Claims, 4 Drawing Sheets

(51) Int. Cl.
*G06Q 20/06* (2012.01)
*G06Q 20/38* (2012.01)
*G06Q 40/04* (2012.01)
*H04L 9/06* (2006.01)
*H04L 9/00* (2022.01)

(52) U.S. Cl.
CPC ........... *G06Q 40/04* (2013.01); *H04L 9/0637* (2013.01); *G06Q 2220/00* (2013.01); *H04L 9/50* (2022.05)

(56) References Cited

U.S. PATENT DOCUMENTS

| | | | |
|---|---|---|---|
| 11,552,950 B2* | 1/2023 | Treat | G06Q 20/223 |
| 2020/0005292 A1* | 1/2020 | Mao | H04L 9/50 |
| 2020/0234257 A1* | 7/2020 | Mallik | G06Q 20/3829 |
| 2020/0402025 A1* | 12/2020 | Wang | H04L 9/0643 |

OTHER PUBLICATIONS

Andreas M. Antonopoulos, Mastering Ethereum, Nov. 2018, O'Reilly Media, Inc. (Year: 2018).*

* cited by examiner

| S. No. | Name Identifier | Blockchain | Public Key |
|---|---|---|---|
| 1 | B1 | Ethereum Blockchain | MIGfMA0GCSqGSIb3DQEBAQUAA4GNADCBiQKBgQCqGKukO1De7zhZj6+H0qtjTkVxwTCpvKe4eCZ0FPqri0cb2JZfXJ/DgYSF6vUpwmJG8wVQZKjeGcjDOL5UlsuusFncCzWBQ7RKNUSesmQRMSGkVb1/3j+skZ6UtW+5u09IHNsj6tQ51s1SPrCBkedbNf0Tp0GbMJDyR4e9T04ZZwIDAQAB |
| 2 | B2 | EOS Blockchain | AAAAB3NzaC1yc2EAAAADAQABAAAAgQCtCnvOu+3qxh+mGvejBMsAVDVA/c8C4su1M6q0xPFISwHOQsmPk3AE2pjwKHOsa0IqxPG39EKrdYhBHB5geMQv3httLIoXzj0oxMEIEhqZ2AgA378DQtky91WcZE67KpmWDOXG95FCBZj7PX7XbdwR+Uk4kLhE2Z6vkWDe7st8rQ== |
| 3 | B3 | Qtum Blockchain | MEkwEwYHKoZIzj0CAQYIKoZIzj0DAQEDMgAESve6BpTMK8t/Hk1gBhJznwxNvZXT3hA4Jk9IhGq9MCXEgINrjxWiy2mCM9Vxc1v4 |

| S. No. | Transaction | Smart Contract Method | Smart Contract | Execution Status | Blockchain Name | Returned hash From IPFS | Output |
|---|---|---|---|---|---|---|---|
| 1 | Txn0 | classify,documents() | @Classifier | Pending | B2 | QmTfCejgo2wTwqnDJs8Lu1pCNeCrCDuE4GAwkna93zdd7d | False |

FIG. 4

SYSTEM AND METHOD FOR MANAGING TRANSACTIONAL INTEROPERABILITY AMONGST BLOCKCHAINS

TECHNICAL FIELD

The present disclosure relates field of data processing on distributed ledger platforms and particularly to interoperability amongst multiple cryptocurrencies executable on different blockchain networks. Moreover, the present invention relates to adding a non-host crypto transaction to a host blockchain.

BACKGROUND

Recently, blockchain and cryptocurrency transactions have witnessed significant growth in terms of acceptance, number of transactions and adaptability to various use cases. With said growth, there has been rise in number of blockchain implementations currently active. While such growing number of blockchains have helped in solving various use cases and designing/implementing complex and efficient smart contracts, this has also resulted in cluttering the space with a number of cryptocurrencies with each blockchain having their respective cryptocurrency that facilitates transactions on said respective blockchain. A user cannot register an account on each of the blockchains, however, though he may wish to execute one or more transactions on a blockchain he is not registered with. This might be due to multiple reasons such as faster processing time on other blockchains or efficient transaction throughput etc. This requires interoperability of cryptocurrency transactions on different blockchains.

One of the commonly used methods for adding transactions on a non-host blockchain i.e. blockchain not registered with by a user is to convert host cryptocurrency to non-host cryptocurrency by means of exchange houses. Another method is to register on multiple blockchains and hold different cryptocurrencies in a wallet aggregator.

However, use of exchange houses requires additional expense incurred in conversion of cryptocurrencies. Further, a user will still require registering with the non-host blockchain in order to maintain a user wallet associated with the non-host blockchain. Wallet aggregators on other hand requires a user to hold multiple cryptocurrencies. Not only this results in additional expense in form of wallet aggregator service charges, it adds complexity of holding cryptocurrency which might not be required/desired by a user for longer term and redundancy of investment locked up in wallet accounts on aggregator platform.

In light of the above-mentioned shortcomings associated with existing methods and systems for adding crypto-currency transactions to non-host blockchains, it is highly desirable to have a system and method that allows near real-time interoperability of cryptocurrency transactions. The present invention, as described below, allows interoperability of cryptocurrency transactions amongst blockchains thereby enabling addition of cryptocurrency transactions to non-host blockchains.

SUMMARY

The present disclosure seeks to provide a system for managing transactional interoperability amongst a plurality of blockchains. The present disclosure also seeks to provide a method for managing transactional interoperability amongst a plurality of blockchains. The present disclosure seeks to provide a solution to the existing problem of lack of interoperability between multiple blockchains. An aim of the present disclosure is to provide a solution that overcomes at least partially the problems encountered in prior art, and provides secure, simplified and reliable technique of facilitating transactions of cryptocurrencies between multiple blockchains.

In one aspect, an embodiment of the present disclosure provides a system for managing transactional interoperability amongst a plurality of blockchains, wherein the system comprises a server arrangement communicably coupled to a distributed file storage system and the plurality of blockchains comprising a non-host blockchain and a host blockchain, the server arrangement configured to:

receive a request for a user transaction to be executed on a non-host blockchain from a user, wherein the host blockchain is associated with a user wallet account storing operational information associated with the user;

append a first transaction to the non-host blockchain, the first transaction comprising metadata pertaining to the user transaction, wherein the non-host blockchain is operable to:
  defer an execution of the user transaction for a predetermined time;
  store the metadata pertaining to the user transaction and operational information requirements on the distributed file storage system at a first hash address;
  update, via an initial smart contract of the non-host blockchain, an execution status of the user transaction;

detect, via a continuous listener module, a deferred transaction stored in the non-host blockchain;

identify, from the metadata pertaining to the user transaction and a blockchain index, a host blockchain corresponding to the user transaction;

append a second transaction to the host blockchain, the second transaction comprising the first hash address, wherein the second transaction triggers an initial smart contract of the host blockchain to store an operational information response at a second hash address in the distributed file storage system;

append a third transaction to the non-host blockchain, the third transaction comprising the second hash address, wherein the third transaction triggers the initial smart contract of the non-host blockchain to
  retrieve the operational information response stored at the second hash address,
  execute the user transaction based on the operational information,
  store output generated from the execution of the user transaction at a third hash address in the distributed file storage system; and append a fourth transaction in the host blockchain, the fourth transaction comprising the third hash address, wherein the fourth transaction triggers the initial smart contract of the host blockchain to update the user wallet account based on the output generated from the execution of the user transaction.

In another aspect, an embodiment of the present disclosure provides a method for managing transactional interoperability amongst a plurality of blockchains, wherein the method is implemented using a system comprising a server arrangement communicably coupled to a distributed file storage system and the plurality of blockchains comprising a non-host blockchain and a host blockchain, the method comprising:

receiving a request for a user transaction to be executed on a non-host blockchain from a user, wherein the host blockchain is associated with a user wallet account storing operational information associated with the user;

appending a first transaction to the non-host blockchain, the first transaction comprising metadata pertaining to the user transaction, wherein the non-host blockchain is operable to:
- defer an execution of the user transaction for a predetermined time;
- store the metadata pertaining to the user transaction and operational information requirements on the distributed file storage system at a first hash address;
- update, via an initial smart contract of the non-host blockchain, an execution status of the user transaction;

detecting, via a continuous listener module, a deferred transaction stored in the non-host blockchain;

identifying, from the metadata pertaining to the user transaction and a blockchain index, a host blockchain corresponding to the user transaction;

appending a second transaction to the host blockchain, the second transaction comprising the first hash address, wherein the second transaction triggers an initial smart contract of the host blockchain to store an operational information response at a second hash address in the distributed file storage system;

appending a third transaction to the non-host blockchain, the third transaction comprising the second hash address, wherein the third transaction triggers the initial smart contract of the non-host blockchain to
- retrieve the operational information response stored at the second hash address,
- execute the user transaction based on the operational information,
- store output generated from the execution of the user transaction at a third hash address in the distributed file storage system; and appending a fourth transaction in the host blockchain, the fourth transaction comprising the third hash address, wherein the fourth transaction triggers the initial smart contract of the host blockchain to update the user wallet account based on the output generated from the execution of the user transaction.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3 is a block diagram depicting a key repository, in accordance with an embodiment of the present disclosure; and FIG. 4 is a block diagram depicting a list associated with an initial smart contract with an entry added corresponding to a user transaction, in accordance with an embodiment of the present disclosure.

Figure 1:
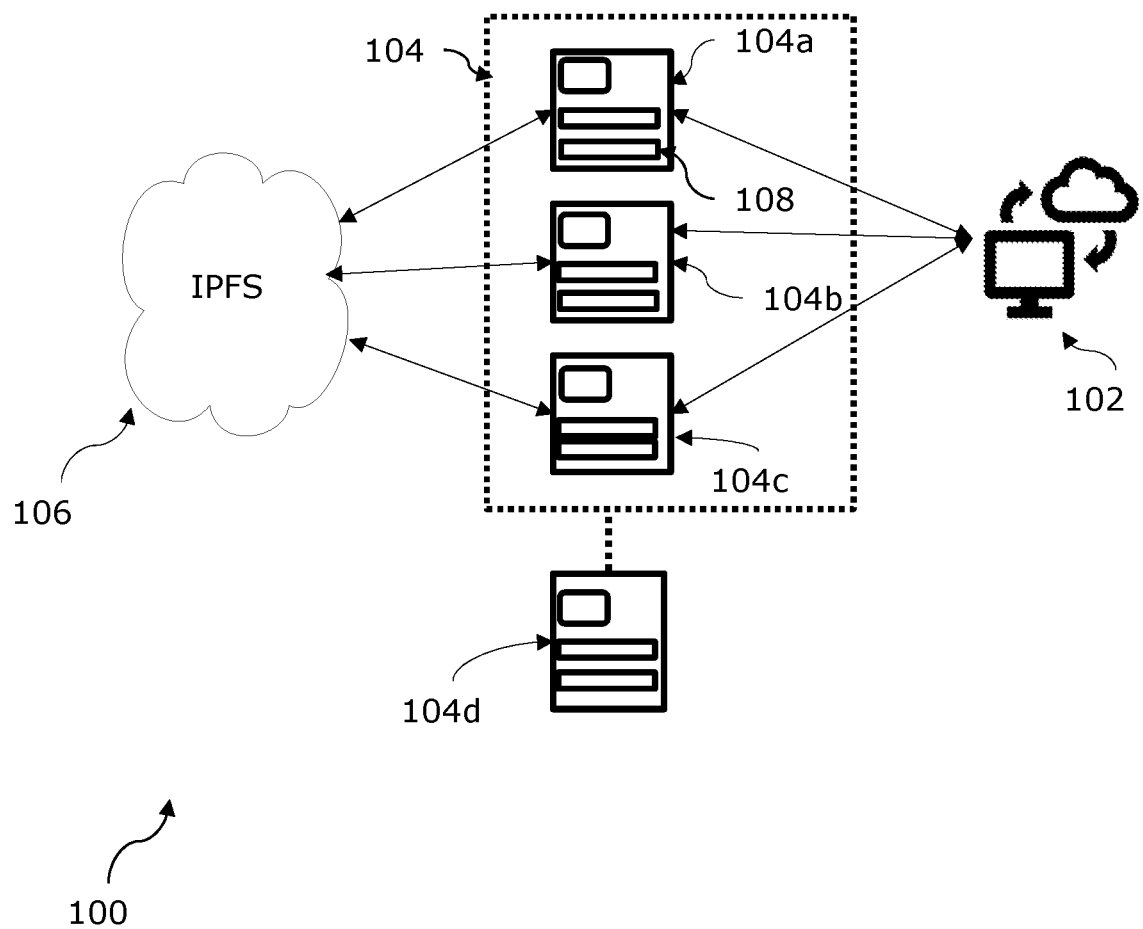
FIG. 1 is a schematic illustration of a system for managing transactional operability between a plurality of blockchains, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible. The person skilled in the art will recognize many variations, alternatives, and modifications of embodiments of the present disclosure. It should be understood that this disclosure is not limited to the particular methodology, protocols, and the like, described herein and as such may vary. The terminology used herein is for the purpose of describing particular embodiments only and is not intended to limit the scope of the present disclosure, which is defined solely by the claims.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments of the aspects described herein, and are not intended to limit the claimed disclosure, because the scope of the disclosure is limited only by the claims. Further, unless otherwise required by context, singular terms shall include pluralities and plural terms shall include the singular.

As used herein the term "comprising" or "comprises" is used in reference to compositions, methods, and respective component(s) thereof, that are essential to the disclosure, yet open to the inclusion of unspecified elements, whether essential or not.

The singular terms "a," "an," and "the" include plural referents unless context clearly indicates otherwise. Similarly, the word "or" is intended to include "and" unless the context clearly indicates otherwise. Thus, for example, references to "the method" includes one or more methods, and/or steps of the type described herein, and/or which will become apparent to those persons skilled in the art upon reading this disclosure and so forth.

Although methods and materials similar or equivalent to those described herein can be used in the practice or testing of this disclosure, suitable methods and materials are described below. The term "comprises" means "includes." The abbreviation, "e.g." is derived from the Latin exempli gratia and is used herein to indicate a non-limiting example. Thus, the abbreviation "e.g." is synonymous with the term "for example".

In one aspect, the present disclosure provides a system for managing transactional interoperability amongst a plurality of blockchains, wherein the system comprises a server arrangement communicably coupled to a distributed file storage system and the plurality of blockchains comprising a non-host blockchain and a host blockchain, the server arrangement configured to:
  receive a request for a user transaction to be executed on a non-host blockchain from a user, wherein the host blockchain is associated with a user wallet account storing operational information associated with the user;
  append a first transaction to the non-host blockchain, the first transaction comprising metadata pertaining to the user transaction, wherein the non-host blockchain is operable to:
    defer an execution of the user transaction for a predetermined time;
    store the metadata pertaining to the user transaction and operational information requirements on the distributed file storage system at a first hash address;
    update, via an initial smart contract of the non-host blockchain, an execution status of the user transaction;
  detect, via a continuous listener module, a deferred transaction stored in the non-host blockchain;
  identify, from the metadata pertaining to the user transaction and a blockchain index, a host blockchain corresponding to the user transaction;
  append a second transaction to the host blockchain, the second transaction comprising the first hash address, wherein the second transaction triggers an initial smart contract of the host blockchain to store an operational information response at a second hash address in the distributed file storage system;
  append a third transaction to the non-host blockchain, the third transaction comprising the second hash address, wherein the third transaction triggers the initial smart contract of the non-host blockchain to
    retrieve the operational information response stored at the second hash address,
    execute the user transaction based on the operational information,
    store output generated from the execution of the user transaction at a third hash address in the distributed file storage system; and
  append a fourth transaction in the host blockchain, the fourth transaction comprising the third hash address, wherein the fourth transaction triggers the initial smart contract of the host blockchain to update the user wallet account based on the output generated from the execution of the user transaction.

In another aspect, the present disclosure provides a method for managing transactional interoperability amongst a plurality of blockchains, wherein the method is implemented using a system comprising a server arrangement communicably coupled to a distributed file storage system and the plurality of blockchains comprising a non-host blockchain and a host blockchain, the method comprising:
  receiving a request for a user transaction to be executed on a non-host blockchain from a user, wherein the host blockchain is associated with a user wallet account storing operational information associated with the user;
  appending a first transaction to the non-host blockchain, the first transaction comprising metadata pertaining to the user transaction, wherein the non-host blockchain is operable to:
    defer an execution of the user transaction for a predetermined time;
    store the metadata pertaining to the user transaction and operational information requirements on the distributed file storage system at a first hash address;
    update, via an initial smart contract of the non-host blockchain, an execution status of the user transaction;
  detecting, via a continuous listener module, a deferred transaction stored in the non-host blockchain;
  identifying, from the metadata pertaining to the user transaction and a blockchain index, a host blockchain corresponding to the user transaction;
  appending a second transaction to the host blockchain, the second transaction comprising the first hash address, wherein the second transaction triggers an initial smart contract of the host blockchain to store an operational information response at a second hash address in the distributed file storage system;
  appending a third transaction to the non-host blockchain, the third transaction comprising the second hash address, wherein the third transaction triggers the initial smart contract of the non-host blockchain to
    retrieve the operational information response stored at the second hash address,
    execute the user transaction based on the operational information,
    store output generated from the execution of the user transaction at a third hash address in the distributed file storage system; and
  appending a fourth transaction in the host blockchain, the fourth transaction comprising the third hash address, wherein the fourth transaction triggers the initial smart contract of the host blockchain to update the user wallet account based on the output generated from the execution of the user transaction.

Figure 2:
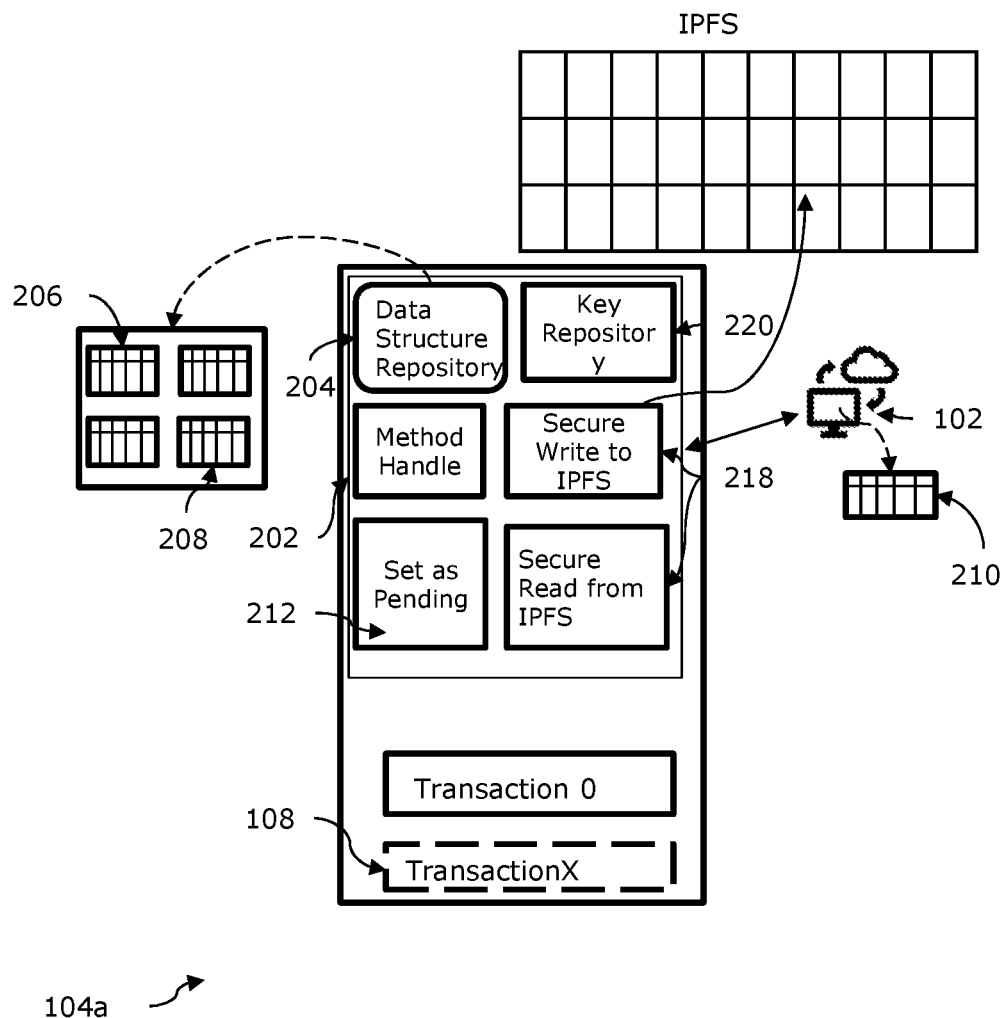
FIG. 2 is an architectural block diagram for a blockchain configured as per the present disclosure.

The present disclosure provides a system and method for managing transactional interoperability amongst a plurality of blockchains, thereby facilitating adding non-host cryptocurrency transactions to a host blockchain. FIG. 1 depicts an exemplary embodiment of a system for managing transactional interoperability amongst a plurality of blockchains. As per the exemplary embodiment of FIG. 1, the system 100 comprises a server arrangement 102 communicably coupled to a plurality of blockchains 104 comprising a host blockchain 104a and a non-host blockchain 104b. Each of the plurality of the blockchains is communicably coupled to a distributed file storage system 106. The distributed file storage system 106 shown in FIG. 1 is Inter planetary File System (IPFS) as per the exemplary embodiment described herein. However, it shall be appreciated that any distributed file storage system would perform in similar manner as IPFS for the purposes of present disclosure. The term "host blockchain" refers to a blockchain, amongst the plurality of blockchains, to which a user has his account created with. Further, the term "non-host blockchain" refers to a blockchain, amongst the plurality of blockcha ins, using which addition of a transaction is desired by the user. Furthermore, the user is associated to the host blockchain through a user wallet account. The server arrangement 102 is operable to add a transaction 108 to any of the plurality of blockchain platforms 104. The transaction 108 may be added through a web-based application or mobile based application on a user interface 108 (as shown in FIG. 2) of the server arrangement 102. In an alternate embodiment, third party extensions on the server arrangement 102 allowing addition of the transaction to the blockchain are used.

Furthermore, each of the plurality of blockchains is configured to allow deferring of execution of a transaction added to it. The transaction is executed at a later point in time and the server arrangement 102 is operable to receive, through the user interface, an output for the executed transaction. Each of the plurality of blockchains are deployed with one or more smart contracts, the one or more smart contracts comprising multiple smart contract methods, each smart contract method pertaining to a defined output. An example of said smart contract method could be getPastEvents( ) which can be used to query the event logs since the beginning of time. Similarly, there can be various smart contract methods programmed on the one or more smart contracts of each of the plurality of blockchains.

In an aspect of the present disclosure, each of the plurality of blockchains are distinct from one another in terms of architecture, configuration, execution speed and a functionality of one of more smart contracts deployed upon them. An example of said distinct blockchains are Ethereum, EOS, Multichain, Stellar, Corda etc. It shall be appreciated that multiple other blockchains may form part of the plurality of blockchains of said system.

Throughout this disclosure the term "server arrangement" refers to an arrangement of one or more servers that includes one or more processors configured to perform various operations, for example, as mentioned earlier. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement can be implemented by way of a single hardware server. The server arrangement can alternatively be implemented by way of a plurality of hardware servers operating in a parallel or distributed architecture. As an example, the server arrangement may include components such as a memory unit, a processor, a network adapter, and the like, to store and process information pertaining to the document and to communicate the processed information to other computing components, for example, such as a client device.

The server arrangement is communicably coupled via one or more communication networks to the plurality of blockchains. The term "one or more communication networks" can be a collection of individual networks, interconnected with each other and functioning as a single large network. Such individual networks may be wired, wireless, or a combination thereof.

Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

The term "user interface" refers to a graphical user interface unit or a command line interface which enables a user to access information stored on the blockchain and/or to store information on the blockchain. Further, the user interface is configured to receive one or more inputs from the user.

Further the term "user wallet account" refers to a digital wallet created by the user on the host blockchain. A user wallet account may be any data structure suitable to store a balance or reflect a balance associated with transactions (e.g., crypto-currency transactions) for a particular service. Optionally, a user wallet account is implemented by means of a wallet aggregator. An example crypto-currency transaction, as used herein, refers to a transaction (e.g., a transfer of funds) using cryptographic currency (or cryptocurrency), such as a digital currency that uses block-chain technology. The user wallet account is created by the user at the time of registering a user account with the host blockchain.

In the following paragraphs, structure of at least one of the plurality of blockchains, communicably coupled to the server arrangement, is described. Although the description is provided with respect to one blockchain, it shall be appreciated by persons skilled in the art that each of the plurality of blockchains, communicably coupled to the server arrangement, is configured in a similar manner. Moreover, any new incoming blockchain into the system must be configured in a similar manner, as described below, to achieve interoperability of transactions, as disclosed by the present disclosure, amongst the plurality of blockchains.

FIG. 2 depicts a detailed architectural block diagram for one of the plurality of blockchains, 104a, hereinafter referred to as exemplary blockchain for the purpose of describing FIG. 2, configured as per the present disclosure. Each of the plurality of blockchains is configured in a similar manner as the exemplary blockchain. The exemplary blockchain comprises an initial smart contract 202 wherein the initial smart contract 202 includes at least one data structure repository 204. The initial smart contract 202 is operable to store, in the data structure repository 204, a list 206 of one or more transactions added to the exemplary blockchain wherein each of the one or more transactions are mapped against a method name, an execution status, and a returned hash from IPFS pertaining to each of the one or more transactions. The term "smart contract method" refers to set of codes which are used to interrogate a smart contract or change its state. A smart contract can have more than one smart contract methods within it, based on the desired output. As a non-limiting example, as used in the accompanying drawings and flowcharts for the present disclosure, getpct( ) is a smart contract method for calculating percentages, given two integers as input parameters. In the above example, getpct is a method name for the smart contract method getpct( ).

Further, the initial smart contract comprises of one or more standard methods 218 operable to perform functions such as writing to and reading from IPFS, deferring a transaction, maintaining a table to name a few. Further, the initial smart contract has at least one method with preconfigured permissions to access the user wallet account and update the user wallet account in case of successful transactions related to the user. The said preconfigured permissions to access the user wallet account are granted to the at least one method of the initial smart contract at the time of creation of the user wallet account. In the exemplary embodiment of the present disclosure, said method with preconfigured permissions to access and update the user wallet account is checkbalance( ). It shall be appreciated by persons skilled in the art that the smart contract method checkbalance( ) is just a nomenclature for the said smart contract method and is used for the purpose of describing the embodiment. In essence, a smart contract method, with any nomenclature, configured to access and update a user wallet account shall suffice the purposes of checkbalance( ) smart contract method.

Further, the initial smart contract 202 is operable to store, in the data structure repository 204, a blockchain index 208 wherein the blockchain index comprises an index of one or more blockchain names, each of the one or more blockchain names mapped against a participant blockchain. Throughout the present disclosure, a method name, a smart contract name, and a blockchain name is an alias used to refer a smart contract method, a smart contract and a blockchain respectively. The alias could be any set of characters, numerical, alphanumeric codes, Hex codes or any nomenclature system capable of referring to and identifying a distinct entity. In an embodiment, the smart contract name may directly refer to the smart contract on a blockchain like in EOS blockchain. Optionally, alternatively, the smart contract name can be used to refer to an address of the smart contract on the blockchain, as in Ethereum blockchain.

Optionally, the sever arrangement 202 maintains a blockchain index 210.

Optionally, the initial smart contract 202 is configured to include a validation indicator 212 wherein the validation indicator 212 indicates an execution status of the transaction added to the blockchain. In an embodiment, the validation indicator 212 is implemented by means of a flag which is set in case of a successful execution of the transaction. In case of deferred execution, the flag is reset until the transaction is executed. The validation indicator is used by the initial smart contract 202 to update the execution status of the transaction in the list 206 maintained in the data structure repository 204.

The term "standard methods" refers to a default method, configured within a smart contract, with pre-configured parameters unalterable by any user of blockchain. Optionally, the initial smart contract further comprises a data structure repository configured to maintain a list of one or more transactions along with the execution status of the one or more transactions. Optionally, the standard methods can be implemented through one or more smart contract wrappers. An example of said standard methods, as used in the preferred embodiment, is "Secure Write to IPFS", "Secure READ from IPFS". Each of the plurality of blockchains is configured for a communication with the distributed file storage system using the one or more standard methods of the initial smart contract. The term "communication", as used herein, refers to reading from and writing to distributed file storage system. The distributed file storage system provides a protocol for storing and exchanging documents for peer-to-peer transfers. Furthermore, information may be stored at various peer pertaining to various public records of the distributed file system. The peer records are not dependent on each other; this ensures that the distributed file system has no failures due to non-functionality of any of the peer records. Once stored, content of information cannot be changed. This makes the distributed file system secure. In case of writing a data record on the distributed file storage system, an address hash is returned from said distributed file system, the address hash indicative of the storage location of the data record. The data record can be read on the distributed file storage system using the returned address hash. It shall be appreciated by the person skilled in the art that the standard method calls referred above are exemplary names with base functionality referring to writing to and reading from a distributed file storage system.

Throughout this disclosure, the term "initial smart contract" refers to a preconfigured smart contract appended to a blockchain and includes a set of object definitions that are created automatically at the time of deployment of the preconfigured smart contract. The initial smart contract is an essential element for each of the plurality of blockchain communicably coupled to the server arrangement. Any new incoming blockchain into the system must be deployed the initial smart contract. Further, the term "data structure repository" refers to an organized collection of data elements stored inside the smart contract on a blockchain. These data elements can have different types and different lengths. The said data structure repositories can be either linear data structures or hierarchical. As a non-limiting example of such data structure repository, as used in one of the embodiments of the present disclosure, are linked lists and arrays with data elements being stored in the data structure repository in key-value pair format. Furthermore, the term "off-chain data storage medium" refers to any storage of data records which isn't stored on a blockchain. An example of such off-chain storage medium is Enigma, Swarm etc. The blockchain, in such cases, reads the data from third party solutions such as Oracle.

Further, the exemplary blockchain is associated with a private key and a public key. The exemplary blockchain is configured to store a key repository 220 within the initial smart contract 202 wherein the key repository 220 comprises a mapping of each of the plurality of blockchain and the public key associated with said blockchain. The key repository 220 updates whenever a new incoming blockchain form part of the plurality of blockchains. The key repository is exposed to any incoming smart contract or the initial smart contract through one of the standard methods. Alternatively, each of the plurality of blockchains may expose the key repository through its ABI (Application Binary Interface). For the purpose of generating said private key and public key, an RSA encryption algorithm, an Elliptic Curve Digital Signature Algorithm (ECDSA), or other encryption algorithm known to those skilled in the art may be employed. FIG. 3 depicts a key repository as per the preferred embodiment of the present disclosure.

The list 206 comprises one or more transactions added to the exemplary blockchain wherein each of the one or more transaction is mapped, inter alia, against a blockchain name, user detail, a currency associated with the user transaction, an execution status for the transaction, and a returned hash from IPFS. An example entry of the list 206 reads as follows: a transaction added to the exemplary blockchain, the execution status of the transaction. The said execution status of the transaction is determined from the validation indicator of the initial smart contract. The list further stores a returned hash from IPFS after the execution of the transaction is complete. An entry reading False indicates that IPFS hash value is not retuned. Consequently, it can be identified that the transaction requires essential information and the execution status is pending, therefore no returned hash from IPFS.

In another aspect of the disclosure, each of the plurality of blockchains securely communicates with the distributed file storage system. Prior to writing an information on the distributed file storage system, each of the plurality of blockchains uses its private key to encrypt the information. This ensures the information is always stored in secure form on the distributed file storage system. The information, as per an aspect of the present disclosure, is the user wallet account balance. Similarly, in order to read the information from the distributed file storage system, each of the plurality of blockchains decrypts the information using the public key of the blockchain which encrypted the information, said public key being available in the key repository of each of the plurality of blockchains.

In operation, a user creates, using a client device, a user wallet account on a host blockchain and configures one or more permissions that allows an initial smart contract on the host blockchain to access and update a user wallet associated with the user account. It shall be appreciated by the person skilled in the art that the host blockchain is configured in a similar manner as the exemplary blockchain depicted in FIG. 2. The server arrangement is configured to receive a request for a user transaction to be executed on a non-host blockchain from a user. The user adds at least one user transaction to a non-host blockchain amongst the plurality of blockchains wherein the user transaction has preconfigured permissions to invoke one or more standard methods of the initial smart contract of the non-host blockchain and further comprises metadata pertaining to the user transaction. The metadata comprises information such as user detail, a host blockchain name, a currency associated with the user account of the user, details of receiver user account etc. The non-host blockchain can be selected by the user owing to a number of reasons including faster execution and response time, greater financial benefits for a given task and other reasons. However, it shall be appreciated that the user transaction is not associated with any user wallet account on the non-host blockchain and further the non-host blockchain doesn't support a host cryptocurrency, the host cryptocurrency being associated with the host blockchain.

The user transaction invokes a standard method within the initial smart contract that adds an entry corresponding to the user transaction to the list maintained in the data structure repository maintained within the initial smart contract of the non-host blockchain. The user transaction added to the non-host blockchain starts executing but is interrupted for the want of operational information, pertaining to the user, available with the host blockchain. As non-limiting example of said operational information stored (or associated) with the user wallet account, as per the preferred embodiment, is wallet details required for executing a transaction, balance in the user wallet account. An execution of the user transaction is deferred. The non-host blockchain is operable to defer an execution of the user transaction for a predetermined time; store the metadata pertaining to the user transaction and operational information requirements on the distributed file storage system at a first hash address; and update, via an initial smart contract of the non-host blockchain, an execution status of the user transaction in the list 206. The deferred execution status of the user transaction is monitored through a validation indicator, implemented by means of a flag which is set in case of pending execution of a transaction. Subsequent to deferring of the user transaction, the initial smart contract of the non-host blockchain is operable to invoke "Secure Write to IPFS" standard method in the initial smart contract of the non-host blockchain. The "Secure Write to IPFS" standard method is configured to encrypt, using a private key of the non-host blockchain, the operational information requirements pertaining to the user transaction. The encrypted operational information requirements is then written on to IPFS. The IPFS returns a first hash address, indicating a first storage location for the encrypted operational information requirements on the IPFS. The entry corresponding to the user transaction in the list maintained in the data structure repository of the initial smart contract of the non-host blockchain is updated with the first hash address, and the deferred execution status.

The continuous listener module of the server arrangement which is continuously monitoring the plurality of blockchains for any changes in events on each of the plurality of blockchains identifies a deferred transaction on the non-host blockchain. Therefore, the server arrangement is configured to detect, via the continuous listener module, a deferred transaction stored in the non-host blockchain. In an embodiment of the present disclosure, each of the plurality blockchain is configured to expose the list 206 through an API. The continuous listener module monitors the exposed APIs to detect change in status of the one or more transactions in the list 206 exposed by each of the plurality of blockchains. Once the continuous listener module detects a deferred execution status for the user transaction on a blockchain, the server arrangement reads the entry, corresponding to the user transaction, in the list through the API exposed by the non-host blockchain. Optionally, the sever arrangement adds a dummy transaction to the non-host blockchain wherein the dummy transaction has pre-configured permissions to access the list maintained in the data structure repository of the initial smart contract of the non-host blockchain and read the first hash address stored in the entry corresponding to the user transaction.

The sever arrangement identifies a host blockchain corresponding to the user transaction based on the metadata extracted from the entry, pertaining to a user transaction, in the list maintained in the data structure repository of the initial smart contract on the non-host blockchain. The identification of the host blockchain is done by querying a blockchain index based on the blockchain name. Optionally, the host blockchain is identified based on the user details extracted from the entry, corresponding to the user transaction, in the list. The server arrangement maintains a user index of user accounts mapped against their respective host blockchains. The server arrangement can query the user index with the user details extracted from the entry corresponding to the user transaction and retrieve the host blockchain name.

Consequent to identification of the host blockchain, the server arrangement is operable to append a second transaction to the host blockchain wherein the query transaction comprises the first hash address and has pre-configured permissions to invoke one or more standard method from the initial smart contract of the host blockchain. An entry corresponding to the second transaction is added to the list maintained in the data structure repository of the initial smart contract of the host blockchain.

The second transaction appended to the host blockchain invokes "Secure Read from IPFS" standard method from the initial smart contract of the host blockchain by passing the first hash address and the non-host blockchain name. The "Secure Read from IPFS" standard method call of the initial smart contract of the host blockchain is configured to retrieve, from the key repository of the host blockchain, a public key corresponding to the non-host blockchain name i.e. the non-host blockchain. Further, the "Secure Read from IPFS" standard method decrypts, using the retrieved public key of the non-host blockchain, and reads operational information requirements pertaining to the user transaction available at the first hash address of IPFS. The operational information requirements are returned by the "Secure Read from IPFS" standard method and the same is stored in the data structure repository of the initial smart contract of the host blockchain. The initial smart contract on the host blockchain is operable to retrieve the operational information requirements pertaining to the user transaction from the user wallet account associated with the user and prepare an operational information response. Subsequently, the standard method "Secure Write to IPFS" is invoked from initial smart contract of the host blockchain wherein the "Secure Write to IPFS" standard method takes the operational information response as input parameter. The "Secure Write to IPFS" standard method is configured to encrypt, using a private key of the host blockchain, operational information response and write the encrypted operational information response to a second storage location in IPFS. The "Secure Write to IPFS" standard method returns a second hash address which is stored in the data structure repository of the initial smart contract of the host blockchain. Further, the entry corresponding to the second transaction in the list maintained in the data structure repository of the initial smart contract of the host blockchain is updated with the second hash address. The server arrangement is configured to receive the second hash address from the entry in the list wherein the list is readable by means of an exposed API by the host blockchain. Alternatively, the server arrangement can retrieve the second hash address by adding a dummy transaction to the host blockchain wherein the dummy transaction has preconfigured permissions to access the list and retrieve the entry details from the list. Alternatively, optionally, the second hash address is returned as a result of successful execution of the query transaction and is received by the server arrangement.

Subsequently, the server arrangement is operable to append a third transaction to the non-host blockchain wherein the third transaction comprises the second hash address and optionally, a host blockchain name. The host blockchain name is an alias for the host blockchain. The system transaction appended to the non-host blockchain invokes "Secure Read from IPFS" standard method from the initial smart contract of the non-host blockchain by passing the second hash address and the host blockchain name. The "Secure Read from IPFS" standard method call of the initial smart contract of the non-host blockchain is configured to retrieve, from the key repository of the non-host blockchain, a public key corresponding to the host blockchain name i.e. the host blockchain. Further, the "Secure Read from IPFS" standard method decrypts, using the retrieved public key of the host blockchain, and reads the operational information response available at the second hash address of IPFS. The operational information response returned by the "Secure Read from IPFS" standard method is stored in the data structure repository of the initial smart contract of the non-host blockchain. The third transaction triggers the initial smart contract of the non-host blockchain to store output generated from the execution of the user transaction at a third hash address in the distributed file storage system.

Once the operational information response pertaining to the user transaction is received by the non-host blockchain, execution of the user transaction is resumed from the deferred state. Further, the validation indicator is reset indicating the execution status as on-going for the user transaction. The user transaction is successfully executed and the entry corresponding to the user transaction in the list maintained in the data structure repository of the initial smart contract on the non-host blockchain is updated to indicate successful execution.

The continuous listener module detects a completion of successful execution of the user transaction through the entry in the list. Based on detection of successful execution of the user transaction by the continuous listener module, the server arrangement adds a fourth transaction to the host blockchain wherein the host blockchain has preconfigured permissions to invoke one or more standard methods within the initial smart contract. The one or more standard methods update the user wallet account associated with the user based on the user transaction. Notably, the fourth transaction triggers the initial smart contract of the host blockchain to update the user wallet account based on the output generated from the execution of the user transaction. Alternatively, optionally, information pertaining to successful execution of the user transaction on the non-host blockchain may be oracalized, through a third party application, into the host blockchain and based on the oracalized information, the initial smart contract on the host blockchain updates the user wallet account associated with the user transaction. The update information is available either through oracle or through the essential information pertaining to the user transaction stored in the data structure repository of the initial smart contract on the host blockchain.

FIG. 4 depicts the list 206 with an entry 402 added corresponding to a user transaction.

The sever arrangement 102 receives the smart contract method name classify.documents and the first address hash QmTfCejgo2wTwqnDJs8Lu1pCNeCrCDuE4GAwkna-93zdd7d by querying the entry 402 of the list 206 from the host blockchain 104a.

The following paragraphs disclose an example scenario implementing the claimed disclosure.

In operation, a user registered with one of the plurality of blockchains communicably coupled to the server arrangement, hereinafter designated as a host blockchain for the purpose of this example, registers a user account with the host blockchain wherein the user account is associated with a cryptocurrency C1.

The user adds, through the sever arrangement, a user transaction Txn0 to the non-host blockchain. Txn0 invokes "Secure Write to IPFS" standard method \in the initial smart contract of the non-host blockchain. The "Secure Write to IPFS" standard method encrypts, using a private key of the non-host blockchain, operational information requirements for execution of the user transaction Txn0 and writes to a first storage location in IPFS.

Further, IPFS returns a first hash address QmIfJejgo2gTwqnMJs8Lu1pVNedrCDuE4GAwkn-a93zde9a. Subsequently, execution of Txn0 is deferred. An entry corresponding to the first Txn0 is added to the list maintained in the data structure repository of the initial smart contract of the non-host blockchain.

The server arrangement, via the continuous listener module detects a deferred transaction Txn0 on the non-host blockchain. Subsequent to detection of the deferred transaction, the server arrangement retrieves the first address hash QmIfJejgo2gTwqnMJs8Lu1pVNedrCDuE4GAwkna9-3zde9a by querying the entry of the list from the host blockchain.

The server arrangement appends a second transaction Txn1 to the non-host blockchain wherein Txn1 comprises the first hash address QmIfJejgo2gTwqnMJs8Lu1pVNedrCDuE4GAwkna93zde9a and a blockchain name B2 for the non-host blockchain. Txn1 invokes "Secure Read from IPFS" from the initial smart contract of the host blockchain by passing the first hash address. The "Secure Read from IPFS" is configured to retrieve, from the key repository of the host blockchain, a public key MIGfMA0GCSqGSIb3DQEBAQUAA4GNADCBiQ-KBgQCqGKukO1De7zhZj6+H0qtj
TvKe4eCZ0FPqri0cb2JZfXJ/
DgYSF6vUpwmJG8wVQZKjeGcjDOL5UIsuusFnczWB
Q7RKNUSesmQRMSGkVb1/3j+skZ6UtW+
5u09IHNsj6tQ51s1SPrCBkedbNf0Tp0
GbMJDyR4e9T04ZZwIDAQAB corresponding to the blockchain name B2 i.e. a public key of the non-host blockchain. "Secure Read from IPFS" decrypts information available at the first address hash QmIfJejgo2gTwqnMJs8Lu1pVNedrCDuE4GAwkna93zde9a and returns required operational information. The host blockchain is operable to retrieve the required operational information from the user wallet account associated with the user. Subsequently, the standard method "Secure Write to IPFS" is invoked from initial smart contract of the host blockchain. The "Secure Write to IPFS" standard method is configured to encrypt, using a private key of the host blockchain, and write a required operational information response to a second storage location in IPFS. The "Secure Write to IPFS" standard method returns a second hash address
QyIfJefgI9gYwqxABs8Iv1IVDedrCOuW8GHwkna93zde2f.

Subsequently, the server arrangement is operable to append a third transaction Txn2 to the non-host blockchain wherein Txn2 comprises the second hash address QyIfJefgI9gYwqxABs8Iv1IVDedrCOuW8GHwkna93zde2f and a host blockchain name B1 for the host blockchain. Txn2 invokes "Secure Read from IPFS" standard method from the initial smart contract of the non-host blockchain B1 by passing the second hash address and the host blockchain name B1 for the host blockchain. The "Secure Read from IPFS" standard method is configured to retrieve, from the key repository of the non-host blockchain B2, a public key corresponding to host blockchain name B1 i.e. a public key of the host blockchain. Further, the "Secure Read from IPFS" decrypts, using the retrieved public key of the host blockchain B2, and reads the requires operational information response available at the second hash address QyIfJefgI9gYwqxABs8Iv1IVDedrCOuW8GHwkna93zde2f. The required operational information response returned by the "Secure Read from IPFS" standard method is stored in the data structure repository of the initial smart contract of the non-host blockchain. Further, the validation indicator is reset indicating the execution status as on-going for the user transaction. The user transaction is successfully executed on the non-host blockchain. The entry corresponding to user transaction is updated to indicate the successful execution of the user transaction on the non-host blockchain.

The continuous listener module of the server arrangement detects the successful execution status of the user transaction and subsequent to said detection, the server arrangement is operable to add a fourth transaction Txn3 to the host blockchain wherein the fourth transaction invokes a standard method in the initial smart contract on the host blockchain to update the user wallet account associated with the user that added the user transaction. Once the first update transaction is successfully executed, the server arrangement adds an update transaction to the non-host transaction wherein the update transaction invokes a standard method within the initial smart contract on the non-host blockchain to validate the successful execution of the user transaction.

It shall be appreciated by the person skilled in the art that the foregoing description and embodiments depict interoperability between two blockchain and that the same can be extended to a plurality of blockchains communicably coupled to the server arrangement. It will be further appreciated that the terms "first", "second" and the like herein do not denote any specific role or order or importance, but rather are used to distinguish one party from another.

Any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. At least portions of the functionalities or processes described herein can be implemented in suitable computer-executable instructions.

It will be appreciated that features of the present disclosure are susceptible to being combined in various combinations and additional features may be introduced without departing from the scope of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

I claim:

1. A system for managing transactional interoperability amongst a plurality of blockchains, wherein the system comprises:
    a server arrangement communicably coupled to a distributed file storage system and the plurality of blockchains comprising a non-host blockchain and a host blockchain;
    the distributed file storage system, wherein the distributed file storage system provides a protocol for storing and exchanging documents for peer-to-peer transfers; and
    a blockchain network comprising a plurality of computer nodes, wherein each computer node of the plurality of computer nodes includes a node computer processor, and a node memory coupled with the node computer processor, wherein the node memory stores the plurality of blockchains and a plurality of initial smart contracts comprising a host initial smart contract of the host blockchain and a non-host initial smart contract of the non-host blockchain capable of dynamically exchanging information between each blockchain in the plurality of blockchains via the distributed file storage system, the node memory storing instructions that, when executed by the node computer processor, cause the node computer processor to execute the at least one of the host initial smart contract and the non-host initial smart contract;

wherein the server arrangement is configured to:
receive a request for a user transaction to be executed on the non-host blockchain from a user, wherein the user is not registered on the non-host blockchain, and wherein the host blockchain is associated with a user wallet account storing operational information associated with the user and wherein the operational information includes a cryptocurrency;

append a first transaction to the non-host blockchain, the first transaction comprising metadata pertaining to the user transaction, wherein the first transaction triggers the node computer processor to execute the non-host initial smart contract to:
  defer an execution of the user transaction for a predetermined time;
  encrypt using a private key of the non-host blockchain and store the metadata pertaining to the user transaction and operational information requirements on the distributed file storage system at a first hash address;
  update an execution status of the user transaction;
detect the deferred user transaction stored in the non-host blockchain;
decrypt, utilizing a public key of the non-host blockchain, information written to the first hash address enabling the host blockchain to retrieve information from the user wallet on the host blockchain;
identify, from the metadata pertaining to the user transaction and a blockchain index, a non-host blockchain name corresponding to the user transaction;
append a second transaction to the host blockchain, the second transaction comprising the first hash address and the name of the non-host blockchain, wherein the second transaction triggers the node computer processor to execute the host initial smart contract to:
  retrieve a non-host public key corresponding to the non-host blockchain name;
  utilize the non-host public key to decrypt the metadata pertaining to the user transaction and operational information requirements on the distributed file storage system read at the first hash address; and
  store an encrypted operational information response at a second hash address in the distributed file storage system by utilizing a host private key;
append a third transaction to the non-host blockchain, the third transaction comprising the second hash address and the host blockchain name, wherein the third transaction triggers the node computer processor to execute the non-host initial smart contract to:
  retrieve and decrypt, utilizing the host public key, the operational information response stored at the second hash address;
  execute the user transaction based on the operational information;
  update the execution status of the user transaction to successful; and
  encrypt, using a private key of the non-host blockchain, and store, output generated from the execution of the user transaction at a third hash address in the distributed file storage system;
detect the successful execution status of the user transaction stored on the non-host blockchain; and
append a fourth transaction in the host blockchain, the fourth transaction comprising the third hash address, wherein the fourth transaction triggers the node computer processor to execute the initial smart contract of the host blockchain to update the cryptocurrency associated with the user wallet account based on the output generated from the execution of the user transaction.

2. The system of claim 1, wherein the host initial smart contract and the non-host initial smart contract comprise one or more standard method calls for communication with the distributed file storage system.

3. The system of claim 1, wherein the host initial smart contract and the non-host initial smart contract further comprise a data structure repository configured to maintain a list of one or more transactions along with the execution status of the one or more transactions.

4. The system of claim 1, wherein each of the host blockchain and the non-host blockchain is configured to encrypt the communication with the distributed file storage system.

5. The system of claim 4, wherein each of the host blockchain and the non-host blockchain are assigned with a private key and a public key.

6. The system of claim 1, wherein the operational information associated with the user comprises at least one of: a balance in the user wallet account, and wallet details required for executing the user transaction.

7. The system of claim 1, wherein the predetermined time is based on an execution time of the host initial smart contract.

8. A method for managing transactional interoperability amongst a plurality of blockchains, wherein the method is implemented using a server arrangement communicably coupled to a distributed file storage system and the plurality of blockchains comprising a non-host blockchain and a host blockchain, the distributed file storage system, wherein the distributed file storage system provides a protocol for storing and exchanging documents for peer-to-peer transfers, and a blockchain network comprising a plurality of computer nodes, wherein each computer node of the plurality of computer nodes includes a node computer processor, and a node memory coupled with the node computer processor, wherein the node memory stores the plurality of blockchains and a plurality of initial smart contracts comprising a host initial smart contract of the host blockchain and a non-host initial smart contract of the non-host blockchain capable of dynamically exchanging information between each blockchain in the plurality of blockchains via the distributed file storage system, the node memory storing instructions that, when executed by the node computer processor, cause the node computer processor to execute the at least one of the host initial smart contract and the non-host initial smart contract, wherein the method comprises:
receiving, by the server arrangement, a request for a user transaction to be executed on the non-host blockchain from a user, wherein the user is not registered on the non-host blockchain, wherein the host blockchain is associated with a user wallet account storing operational information associated with the user and wherein the operational information includes a cryptocurrency;
appending, by the server arrangement, a first transaction to the non-host blockchain, the first transaction comprising metadata pertaining to the user transaction, wherein the appending the first transaction triggering the node computer processor executing the non-host initial smart contract to perform:
- deferring an execution of the user transaction for a predetermined time;
- encrypting, using a private key of the non-host blockchain, and storing, the metadata pertaining to the user transaction and operational information requirements on the distributed file storage system at a first hash address; and
- updating an execution status of the user transaction;

detecting, by the server arrangement the deferred user transaction stored on the non-host blockchain;

decrypting, by the server arrangement, utilizing a public key of the non-host blockchain, information written to the first hash address, enabling the host blockchain to retrieve information from the user wallet on the host blockchain;

identifying, by the server arrangement, from the metadata pertaining to the user transaction and a blockchain index, the non-host blockchain name corresponding to the user transaction;

appending, by the server arrangement, a second transaction to the host blockchain, the second transaction comprising the first hash address and a name of the non-host blockchain, wherein the appending the second transaction triggering the node computer processor executing the host initial smart contract to perform:
- retrieving a non-host public key corresponding to the non-host blockchain name;
- utilizing the non-host public key while decrypting the metadata pertaining to the user transaction and operational information requirements on the distributed file storage system read at the first hash address; and
- storing an encrypted operational information response at a second hash address in the distributed file storage system by utilizing a host private key;

appending, by the server arrangement, a third transaction to the non-host blockchain, the third transaction comprising the second hash address and the host blockchain name, wherein the appending the third transaction triggering the node computer processor executing the non-host initial smart contract to perform:
- retrieving and decrypting, utilizing the host public key, the operational information response stored at the second hash address;
- executing the user transaction based on the operational information;
- updating the execution status of the user transaction to successful; and
- encrypting, using a private key of the non-host blockchain, and storing, output generated from the execution of the user transaction at a third hash address in the distributed file storage system;

detecting, by the server arrangement, the successful execution status of the user transaction stored on the non-host blockchain; and appending, by the server arrangement, a fourth transaction in the host blockchain, the fourth transaction comprising the third hash address, wherein the appending the fourth transaction triggering the node computer processor executing the host initial smart contract to perform updating the user wallet account based on the output generated from the executing of the user transaction.

9. The method of claim 8, wherein the host initial smart contract and the non-host initial smart contract comprise one or more standard method calls for communication with the distributed file storage system.

10. The method of claim 8, wherein the host initial smart contract and the non-host initial smart contract further comprise a data structure repository configured to maintain a list of one or more transactions along with the execution status of the one or more transactions.

11. The method of claim 8, wherein each of the host blockchain and the non-host blockchain is configured to encrypt the communication with the distributed file storage system.

12. The method of claim 11, wherein each of the host blockchain and the non-host blockchain are assigned with a private key and a public key.

13. The method of claim 8, wherein the operational information associated with the user comprises at least one of: a balance in the user wallet account, and wallet details required for executing the user transaction.

14. The method of claim 8, wherein the predetermined time is based on an execution time of the host initial smart contract.

* * * * *